United States Patent [19]
Smith

[11] 3,844,927
[45] Oct. 29, 1974

[54] ELECTRODIALYTIC RECOVERY OF ACID AND INSOLUBLE PRODUCTS FROM SPENT LIQUORS

[75] Inventor: Richard N. Smith, East Norwalk, Conn.

[73] Assignee: Sybron Corporation, Rochester, N.Y.

[22] Filed: Nov. 1, 1973

[21] Appl. No.: 411,652

Related U.S. Application Data

[62] Division of Ser. No. 250,625, May 5, 1972, Pat. No. 3,788,959.

[52] U.S. Cl............................ 204/301, 204/180 P
[51] Int. Cl............................................ B01d 13/02
[58] Field of Search............... 204/301, 180 P, 151

[56] References Cited
UNITED STATES PATENTS

| | | |
|---|---|---|
| 3,227,662 | 1/1966 | Kollsman....................... 204/301 X |
| 3,369,906 | 2/1968 | Chen................................... 99/77 |
| 3,394,068 | 7/1968 | Calmon et al................... 204/301 X |
| 3,507,764 | 4/1970 | Asahi et al..................... 204/301 X |

Primary Examiner—John H. Mack
Assistant Examiner—A. C. Prescott
Attorney, Agent, or Firm—Theodore B. Roessel

[57] ABSTRACT

A multi-chambered electrodialytic apparatus and process are used to recover excess free acid and to regenerate and concentrate acid from spent liquors, e.g., spent pickle liquors. Sulfuric acid and hydrochloric acid are recovered and regenerated from their respective iron and steel pickle liquors along with oxides and hydroxides of iron. Efficiency for the recovery of the sulfuric or hydrochloric acids from the spent pickle liquor is greatly improved by using an electrodialytic apparatus having in sequence an anode chamber, at least one concentrating chamber, a spent liquor chamber and a cathode chamber. A sequestrant is used in the catholyte to prevent membrane fouling. Other values are recovered depending upon the make-up of the spent liquors.

9 Claims, 5 Drawing Figures

ELECTRODIALYTIC RECOVERY OF ACID AND INSOLUBLE PRODUCTS FROM SPENT LIQUORS

CROSS REFERENCES TO RELATED APPLICATIONS

This is a division of application Ser. No. 250,625, filed 5/5/72, now U.S. Pat. No. 3,788,959.

BACKGROUND OF THE INVENTION

This invention relates generally to electrodialysis, and more particularly, to the electrodialytic recovery, regeneration and concentration of acid from inorganic acids containing metals and to a method for regenerating spent liquors with the recovery of insoluble products therefrom.

Spent liquor as used herein refers to any acid-metal salt mixture wherein the metal in the form of metallic cations is capable of forming insoluble products with anions migrating in an electrodialytic apparatus. Such liquors may be produced from digestion or extraction of ores with inorganic acids, from the pickling of metals with inorganic acids and the like. Examples of acid-metal salt mixtures, the metal cations of which form insoluble products, such as oxides and hydroxides, when they associate with migrating anions, such as hydroxide anions, are sulfuric acid-ferrous sulfate, hydrochloric acid-ferrous chloride, chromic acid-aluminum chromate, sulfuric acid-nickel sulfate and the like.

"Spent pickle liquor" is a conventional trade term used to describe an inorganic acid solution which has been used to dissolve and remove oxide layers (commonly known as "mill scale") from surfaces of iron and steel products or other metals. The pickling process is ordinarily carried out by immersion of the oxide-coated metal in an acid solution at elevated temperatures. The acid concentration of the solution may vary from about 5 to 50 percent depending upon the acid used and the metal to be treated. The temperature range is usually about 140°–220°F. and is largely governed by economic considerations. When the spent pickle liquor comprises a liquor used to treat iron and steel products, the spent acid often contains up to 10 percent unused free acid as well as up to 30 percent iron oxides as the ferrous salt of the acid. The spent pickle liquor is an acid depleted liquor containing at least one metal (metallic cations) such as iron (ferrous and/or ferric ions) in solution. As used herein spent liquor and spent pickle liquor may be used interchangeably.

Spent pickle liquor disposal is of great public concern in view of the fact that improper methods of disposal of the liquor result in pollution of rivers, lakes, underground water tables and the like. Chemical methods for the neutralization and treatment of spent liquors have been developed, but none of these have achieved widespread acceptance because of the cumbersome equipment required and the quantities of treating chemicals consumed. Electrodialytic methods for the treatment of spent pickle liquor are also known, and one process utilizing an electrodialytic cell having separate chambers defined by selective ion exchange membranes is described in U.S. Pat. No. 3,394,068 wherein the apparatus comprises an alkaline-containing catholyte chamber with a suitable cationic sequestrant, an acid-containing anolyte chamber and a central or middle chamber containing the metal-contaminated acid. In the cited patent provisions are made for a three-chambered cell wherein the catholyte, anolyte and liquor to be purified are contained in separate chambers with no provision for transfer between said chambers except by ionic migration through the ion permselective membranes. Problems of membrane fouling have been overcome therein by supplying a sequestrant within the catholyte.

Permselective membranes offer an efficient method for separating adjacent streams of fluid while allowing certain ions to pass through the membranes under the influence of an electrical potential gradient. These may be either of the anion permselective type or cation permselective type, depending upon the ion exchange material which is used in their preparation. In an ideal system, anion permselective membranes permit anions (negatively charged ions) to pass through while repelling cations (positively charged ions), and cation permselective membranes operate in the opposite manner. Ideal systems, however, have not as yet been developed, and leakage of the ion to be repelled occurs across the membrane. It is believed that the leakage is due to osmotic and dialytic transfer processes caused by the concentration difference across the membrane. It is also believed that the leakage occurs in view of the strong mobility of certain of the ions found in the electrolyte solutions.

In electrolytic reactions of the type wherein an aqueous anolyte solution is used, the following reaction is believed to take place at the anode:

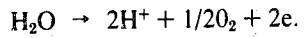

As seen from the equation hydrogen ion is generated in the reaction at the anode and oxygen gas is liberated.

The mobility of the hydrogen ion in aqueous solution is nearly one order of magnitude greater than other cations and is approximately double the mobility of OH⁻ ions in similar solutions. The high mobility of the hydrogen ion is also believed to be an important factor in the leakage of hydrogen ion through anion permselective membranes. Thus, some of the highly mobile hydrogen ions, after they are generated at the anode, are lost to the spent pickle liquor solution in the middle chamber of the three-chamberd unit described in U.S. Pat. No. 3,394,068 when the hydrogen ion, in attempting to migrate toward the cathode, passes through the anion selective membrane. This not only results in a loss of acid value but also increases the acidity of the spent pickle liquor stream and thereby provides a medium in which the solubility of the forming precipitate is greater. As the acid content of the anode chamber increases, the migration of the highly mobile hydrogen ion into the middle chamber becomes even greater and thereby results in greater loss of acid and greater inhibition of precipitate formation.

OBJECTS OF THE INVENTION

Accordingly, it is an object of this invention to provide an electrodialytic apparatus and process which will substantially prevent the migration of hydrogen ion into the spent liquor chamber containing the liquor to be regenerated.

It is another object of this invention to provide an electrodialytic apparatus and process for improving the efficiency of recovery of inorganic acids from spent liquors.

Another object of this invention is to provide an electrodialytic apparatus and process wherein the acid content of the spent liquor chamber is substantially reduced to permit greater precipitation of insoluble products therein.

It is another object of this invention to provide an electrodialytic apparatus and process wherein the unavoidable migration of hydrogen ions across ion permeable barriers is advantageous in the recovery, concentration and and/or regeneration of inorganic acids from spent inorganic acids containing metallic ions.

Another object of this invention is to provide an electrodialytic regeneration apparatus and process wherein metal values may be recovered while recovering substantial amounts of free and bound acid.

It is another object of this invention to provide an electrodialytic method for recovering the hydrogen ions generated electrodialytically within the chambers of an electrodialytic apparatus while recovering substantially all of the iron value in a precipitated form other than a metallic deposit on the cathode, from a spent pickle liquor used for cleaning the surfaces of iron and steel products or other metals.

Still another object of this invention is to provide a method and apparatus for efficiently concentrating mineral (inorganic) acid recovered and regenerated from a metal pickling, metal digestion or metal extraction process and thereafter recycling the recovered mineral acid back to the pickling, digestion or extraction process thereby eliminating the need for adding strong virgin acid to the process.

Other objects will become evident to those skilled in the art from a reading of this specification and the appended claims and drawings.

SUMMARY OF THE INVENTION

The above objects are achieved by employing an electrodialytic process utilizing an electrodialytic cell having an end anode chamber adapted to contain anolyte, an anode having a surface in the anode chamber adapted to be in contact with the anolyte, an end cathode chamber adapted to contain catholyte, a cathode having a surface in the cathode chamber adapted to be in contact with the catholyte, a spent liquor chamber adapted to contain a spent liquor, such as, an inorganic acid containing metallic ions, and at least one concentrating chamber adapted to contain an electrolyte and disposed between the spent liquor chamber and the anode chamber, all of said chambers separated from adjacent chambers by ion permeable membranes. The chambers are incorporated within a suitable frame and means for imposing a difference in potential across the anode and cathode are provided as well as means for passing electrolytes, liquors and the like into, through and out of the respective chambers. When the chambers of the described apparatus contain the respective electrolytes, liquors or solutions, and a potential is provided across the electrodes, the process of the present invention occurs. The inorganic acid is regenerated recovered and concentrated in the anode and/or concentrating chambers, and the metallic ions form insoluble product or precipitate in the spent liquor chamber.

The electrodialytic process of this invention for treating spent liquors to separate metal values from acid values in said liquors comprises passing a first feed stream of spent liquor, into, through and out of a spent liquor chamber defined by a first and second ion permeable membrane, the first ion permeable membrane being an anion permselective membrane and the second ion permeable membrane being characterized by its ability to permit the migration of anions. A catholyte solution is circulated in the cathode chamber on the opposite side of the first ion permeable membrane. A second feed stream of an electrolyte solution is passed into, through and out of at least one concentrating chamber provided on the opposite side of the second ion permeable membrane. The concentrating chamber or chambers is defined by the second ion permeable membrane and a third ion permeable membrane. An anolyte solution is circulated in the anode chamber on the side of the third ion permeable membrane opposite the acid electrolyte solution. When a direct current is applied to the apparatus, regenerated and excess acid is recovered and concentrated in the acid concentrating chamber, and in certain embodiments of the invention in the anode chamber. Metal values precipitate out in the spent liquor chamber and may be recovered in a suitable solids removal device. The catholyte electrode reaction generates ions that will form substantially insoluble product when they migrate into the presence of metallic ions in the spent liquor within the spent liquor chamber.

In accordance with this invention it is believed that anions in the spent liquor migrate into the electrolyte solution in the concentrating chamber and associate therein with cations having high mobility, such as, hydrogen ions, and when the cations having high mobility are hydrogen ions, an acid is formed in said electrolyte, thereby enriching it with acid values. Anions from the catholyte migrate through the first ion permeable membrane into the spent liquor and there associate with hydrogen ions in the mixture when the mixture contains excess free acid. When hydrogen ions in the spent liquor associate with hydroxide ions which have migrated from the catholyte, they form water in the mixture. If the spent liquor contains no excess free acid or insufficient free acid to provide sufficient hydrogen ion to associate with the migrating catholyte anions, the migrating catholyte anions, generally $OH^-$ ions, form highly separable insoluble products with metal cations in the spent liquor.

A sequestrant may be supplied to the catholyte solution to prevent the formation of insoluble compounds within the matrix of the anion permeable membrane which separates the catholyte solution from the spent liquor.

The embodiment disclosed herein is described with respect to the concentration and recovery of excess free acid and the regeneration, concentration and recovery of bound acid in spent liquor and the recovery of metal values therefrom, however, the invention is applicable to acid systems other than sulfuric acid and hydrochloric acid, e.g., chromic acid, nitric-chromic acid, phosphoric-chromic acid, and the like. Water soluble organic acid systems, such as, formic, oxalic, citric and the like, may also be used herein. By free acid I mean titratable $H^+$, e.g., titratable sulfuric acid, and by bound acid I mean acid anion which has become associated with metal cation in a pickling, digestion or extraction process, and the like e.g., ferrous sulfate in the case of spent sulfuric acid pickle liquor which has been used in cleaning iron and steel products.

Electrolyte or acid electrolyte as used herein is the liquor circulating in the concentrating chamber and which becomes acidic during the operation of the apparatus. Initially, the electrolyte therein may even be water. The water will become acidic during the process. In the case of an apparatus used to regenerate spent liquor the electrolyte solution is preferably sulfuric acid or spent liquor. However, it may also be any solution which will not adversely effect the migration of ions and the formation of acid. Aqueous hydrochloric acid, nitric acid and the like or mixtures thereof and aqueous organic acids, e.g., acetic acid, citric acid, oxalic acid and the like or mixtures thereof may be used, in the concentrating chambers. It is generally preferred that the electrolytes be used in the form of aqueous solutions. Suitable electrolytes and concentrations thereof can be chosen by one skilled in the art. The term electrolyte or acid electrolytes is used herein to designate the solution in the concentrating chamber or chambers, and the term anolyte is an expression used to designate the solution in the anode chamber.

The catholyte solution of this invention may be any electrolyte containing ions which will form substantially insoluble products with metal ions in the liquor undergoing regeneration or purification. Preferred aqueous catholyte solutions may be sodium hydroxide, potassium hydroxide, calcium hydroxide, barium hydroxide, ammonium hydroxide, and the like or mixtures thereof. One skilled in the art can select a suitable catholyte solution for carrying out the regeneration in accordance with the process of my invention.

DESCRIPTION OF THE PREFERRED EMBODIMENTS

Figure 1:
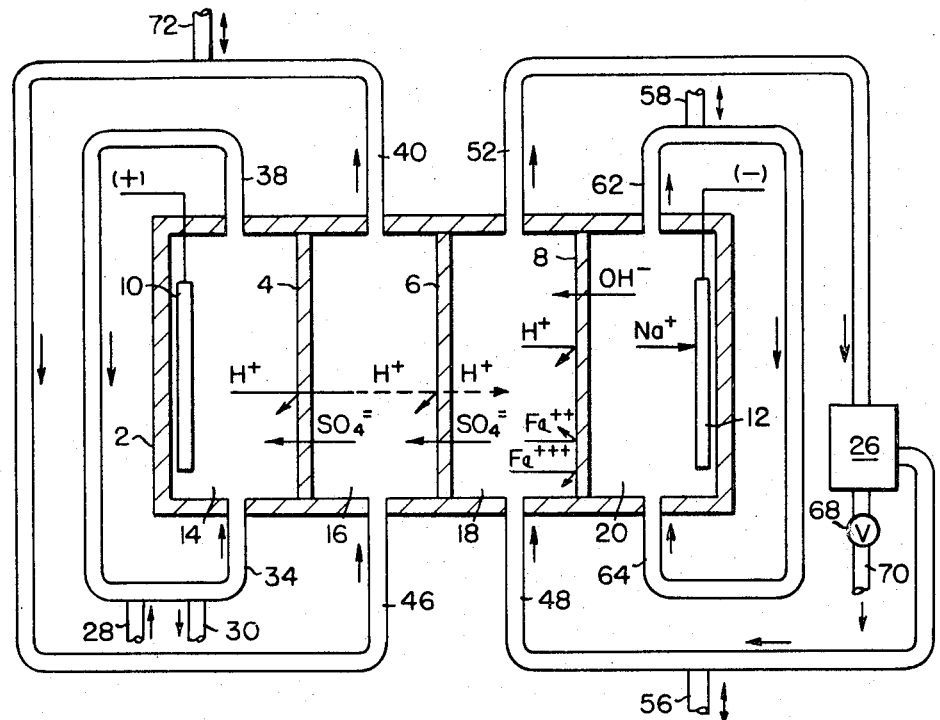
FIG. 1 is diagramatic cross-sectional representation of a four-chambered electrodialytic apparatus designed for batch recycling of the liquor and electrolytes.

Referring to FIG. 1, there is shown a conventional acid- and alkali-resistant electrodialytic apparatus 2 divided into chambers 14, 16, 18 and 20, said chambers being separated from each other by ion permeable membranes 4, 6 and 8 respectively. Suitable frames, anti-billow sheets and other materials of construction (not shown) well-known in the art for defining chambers and assembling electrodialytic apparatuses may be used.

In the embodiment of the invention shown in FIG. 1 ion permeable membranes 4, 6, and 8 are anion permeable membranes. Chamber 14 is an anode chamber by virtue of anode 10 positioned therein. Chamber 20 is a cathode chamber by virtue of cathode 12 positioned therein. Spent liquor chamber 18 is the chamber adjacent cathode chamber 20 and separated from cathode chamber 20 by anion permselective membrane 8. Spent liquor chamber 18 may also be designated as the pickle liquor chamber. Concentrating chamber 16 is adjacent anode chamber 14 and separated therefrom by anion permeable membrane 4. Anode 10 and cathode 12 are connected to a suitable source of direct current (not shown). A solids removal device designated by numeral 26 is schematically shown.

Each chamber is provided with inlet and outlet means. Anode chamber 14 is provided with outlet 38 and inlet 34 for circulating anolyte within the chamber. Outlet 38 communicates with inlet 34 by a suitable conduit for recirculation of the anolyte stream. Lines 28 and 30 are inlet and outlet means for the addition or removal of anolyte and may be combined as a single conduit as appropriate. Outlet 40 and inlet 46 connected by a suitable conduit are used for the circulation of electrolyte within concentrating chamber 16. Conduit 72 is provided for the addition or removal of electrolyte in concentrating chamber 16. Outlet 52 and inlet 48 are used for the circulation of liquor within spent liquor chamber 18 and said lines are operatively connected with solids-removal device 26 by means of suitable conduits. Conduit 56 provides an inlet within chamber 18 for adding raw material (spent pickle liquor) and an outlet for removal of acid-depleted liquor. Outlet 62 and inlet 64 are provided for the circulation of catholyte within catholyte chamber 20, and conduit 58 is provided for the addition of catholyte or make-up water to chamber 20 or the removal of catholyte from chamber 20.

Concentrating chamber 16 is the chamber defined by anion permeable membranes 4 and 6 and is adjacent anode chamber 14 on one side and spent liquor chamber 18 on the other side. Solids removal device 26 is shown equipped with valve 68 and outlet means 70. In the apparatus shown in FIG. 1 the outlets and inlets of the respective chambers are connected by suitable conduits and form closed loops in each chamber for batch recycling.

In the operation of the above described apparatus in accordance with the present invention for the regeneration of spent pickle liquor, said liquor is circulated in chamber 18 while an aqueous solution of sulfuric acid, acid enriched concentration chamber electrolyte or "lean" pickle liquor is circulated within anode chamber 14; an aqueous catholyte solution, preferably an alkali metal hydroxide containing sequestrant, is circulated within cathode chamber 20; and an electrolyte, preferably an aqueous solution of sulfuric acid or "lean" pickle liquor, is circulated within concentrating chamber 16. "Lean" pickle liquor as used herein is spent pickle liquor from which the free acid and the bulk of the iron has been removed by previous treatment, such as, the effluent liquor from spent liquor chamber 18 of the operating electrodialytic apparatus described herein. A direct current of electricity is passed through the cell by means of anode 10 and cathode 12, thus causing cations and anions within the chambers to migrate toward the cathode and anode respectively.

Within anode chamber 14 which contains dilute sulfuric acid, hydrogen ions are formed and migrate toward cathode 12 until they meet anion permeable membrane 4 which normally prevents the migration of cations, therethrough. However, a substantial portion of the hydrogen ions formed at anode 10 and migrating toward cathode 12, leak through the anion permeable membrane 4. These migrating hydrogen ions have a high mobility, and enter concentrating chamber 16 where they are incorporated into the acid electrolyte solution therein and enrich the electrolyte with hydrogen ions.

Within spent liquor chamber 18, which contains spent pickle liquor comprising principally iron cations, hydrogen cations and sulfate anions, the sulfate anions, $SO_4^{-2}$, migrate toward anode 10, and since membrane 6 is anion permeable, the sulfate anions pass through said membrane barrier into concentrating chamber 16 thereby increasing the overall concentration of sulfate ions within the aqueous acid electrolyte solution circulating in concentrating chamber 16. The hydrogen ions present in and leaking into the electrolyte in concentrating chamber 16 and the migrating sulfate anions in chamber 16 form sulfuric acid in concentrating chamber 16. In this way the electrolyte in the concentrating chamber becomes enriched with sulfuric acid. Except for the highly mobile hydrogen ions, some of which pass through anion permeable membrane 8, cations formed within spent liquor chamber 18 are met by anion permeable membrane 8, in their attempt to migrate toward cathode 12 and are repelled thereby and substantially confined to chamber 18.

Within cathode chamber 20 containing an aqueous alkaline catholyte, preferably an aqueous alkali-metal hydroxide such as sodium hydroxide or potassium hydroxide, hydroxyl anions are formed at the cathode and migrate toward anode 10 passing through anion permeable membrane 8 and into spent liquor chamber 18. The following reaction is believed to take place at the cathode to produce the hydroxyl ions:

$$2H_2O + 2e \rightarrow 2OH^- + H_2.$$

After the free acid has been removed, the net effect of the natural ionic migration coupled with the anion permselective barrier between chambers 18 and 20, is the meeting of the iron cations and hydroxyl anions within chamber 18, whereupon iron hydroxides are formed and are precipitated within chamber 18. The precipitated solids along with circulating solutions are then carried from outlet 52 to solids removal device 26 and recovered as high purity magnetite which is easily removed and may be converted to iron metal.

In an ideal system the hydrogen and iron cation would be completely barred from passing into cathode chamber 20, however, presently available anion permeable membranes permit a small amount of cations to pass therethrough. Absent some precaution iron cations will pass into membrane 8 and meet hydroxyl anions migrating in the opposite direction thus causing precipitation of iron hydroxide within the interstices of said membranes and subsequent fouling. Accordingly, a cationic sequestering agent that is specific for iron cations as disclosed in U.S. Pat. No. 3,394,068, may be provided within chamber 20. The presence of this sequestrant prevents precipitation within the body of the anion permeable membrane and within the cathode chamber 20. The use of sequestrant may be carried out according to U.S. Pat. No. 3,394,068 by one skilled in the art.

In other embodiments of FIG. 1 (not shown) ion permeable membranes 4 and 6 may be any membranes which will permit the migration of anions therethrough including non-selective membranes.

When ion permeable membrane 4 is an anion permeable membrane or a non-selective membrane, sulfate anions which reach concentrating chamber 16 and which remain unassociated with cations in the electrolyte solution contained in concentrating chamber 16, plus any sulfate anions formed in the electrolyte solution contained in concentrating chamber 16, pass through ion permeable membrane 4 and enter anode chamber 14 where they can associate with hydrogen ion formed at anode 10 and migrating in the direction of cathode 12. In this manner, sulfuric acid is also formed in anode chamber 14 and thereby becomes a part of the anolyte solution. Thus, in accordance with the present invention sulfuric acid is formed in concentrating chamber 16 and in anode chamber 14, and respective electrolyte and anolyte therein becomes enriched with the sulfuric acid.

Figure 2:
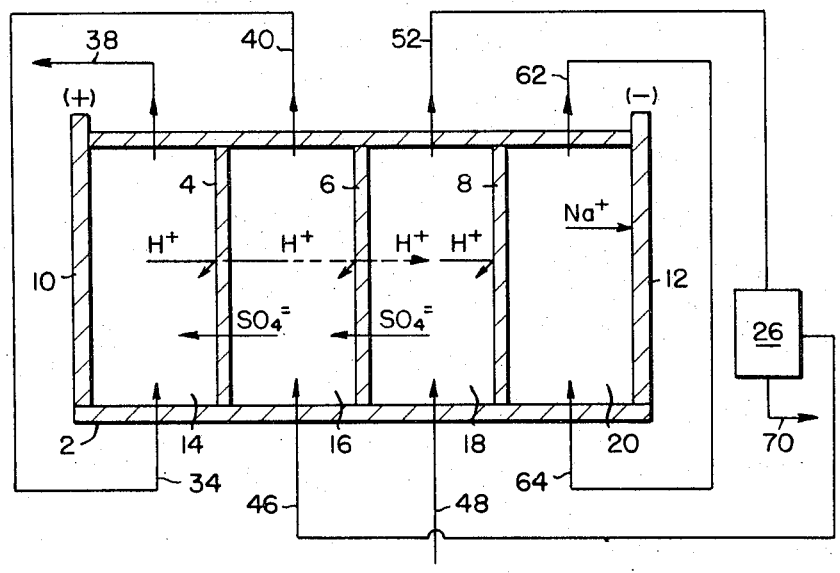
FIG. 2 is a diagramatic cross-sectional representation of a four-chambered electrodialytic apparatus of the present invention designed for operation on a continuous basis and representing staging of flow streams.

Referring to FIG. 2 which discloses another embodiment of the four-chambered electrodialytic apparatus of the present invention, the numerals marked thereon are identified by the terminology disclosed in the description of FIG. 1 above. Valves, vents, gauges, meters, reservoirs and detailed construction which are within the purview of one skilled in the art, are not shown in the drawing. In FIG. 2, outlet conduit lines are diverted to inlet conduits of adjacent chambers so that the electrodialytic apparatus and process can be operated on a continuous, once-through basis. The effluent of the spent liquor chamber is the influent of the concentrating chamber and the effluent of the concentrating chamber is the influent of the anode chamber. This configuration shows "staging" of the flow streams in the respective chambers and minimizes somewhat expensive pumping and recycling equipment required when a batch process as shown in FIG. 1 is used.

The embodiment of FIG. 2 comprises a four-chambered apparatus wherein catholyte is recycled from outlet 62 to inlet 64 in a closed loop. The other three chambers are "staged" in such a way that the spent pickle liquor entering spent liquor chamber 18 through inlet 48, passes as an effluent from chamber 18 by outlet 52 to solids removal device 26 where precipitated iron hydroxide is removed, whereupon after removal of the iron values from the liquor effluent of chamber 18, the "lean" pickle liquor in which the sulfate and iron content has been depleted in chamber 18, then passes as the influent into concentrating chamber 16 at inlet 46 where it becomes enriched with sulfuric acid formed by association of migrating hydrogen and sulfate ions. Accordingly, the "lean" pickle liquor becomes the electrolyte used in concentrating chamber 16. The enriched acid electrolyte (enriched with sulfuric acid) passes as an effluent from chamber 16 at outlet 40 and is circulated to inlet 34 where it becomes influent of anode chamber 14 and is used therein as anolyte. In chamber 14 the anolyte previously enriched with sulfuric acid in chamber 16, is further enriched with sulfuric acid by the association of migrating sulfate anion from chamber 16 into chamber 14 through membrane 4 and hydrogen ion formed at anode 10 and migrating in the direction of the cathode 12. The effluent from anode chamber 14 then passes from outlet 38 and may be directed to storage or to a pickling operation for the removal of oxides from metals. Ion formation and migration in all chambers includng the cathode chamber are the same as described above in the description of the embodiment of FIG. 1.

Figure 3:
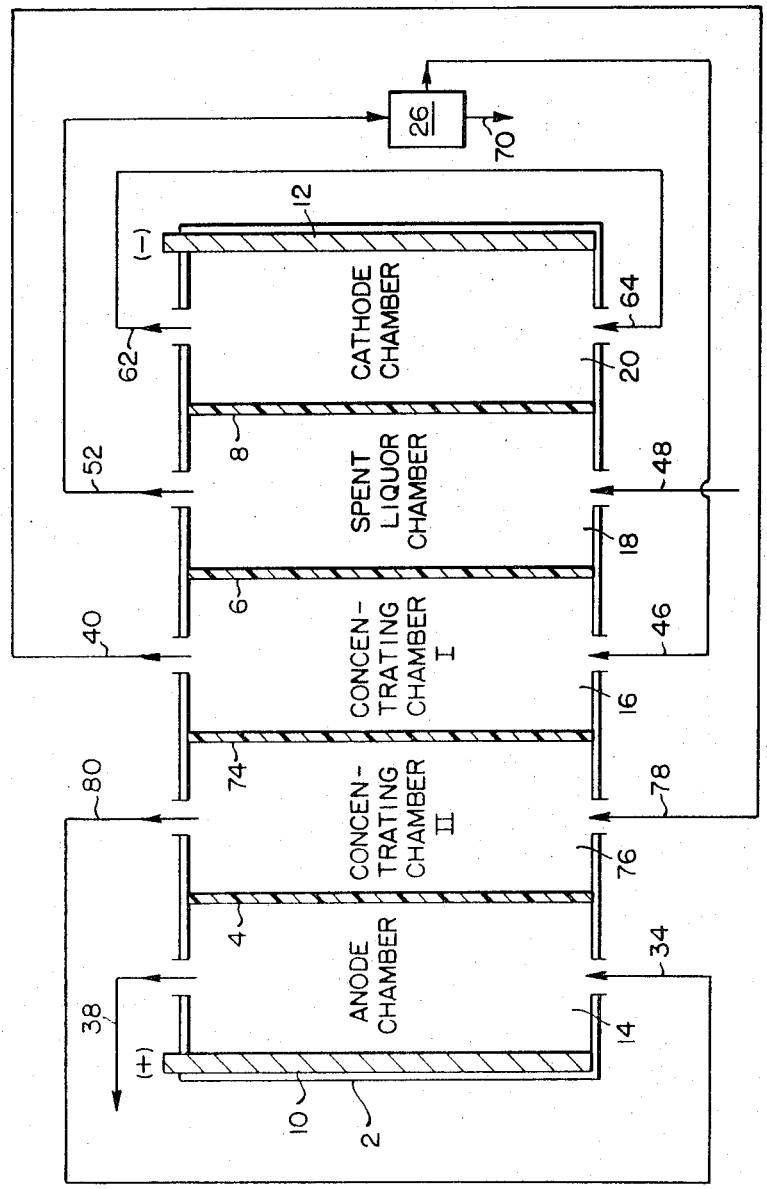
FIG. 3 is a diagrammatic cross-sectional representation of a five-chambered electrodialytic apparatus of the present invention designed for operation on a continuous basis and showing staging of flow streams.

Another embodiment of the present invention encompassing a five-chambered electrodialytic apparatus and process is disclosed in FIG. 3. Two concentrating chambers designated as concentrating chamber I or first concentrating chamber and represented by numeral 16 and concentrating chamber II or second concentrating chamber designated by numeral 76, are disposed between anode chamber 14 and spent liquor chamber 18. Concentrating chamber 1 is defined by ion permeable membrane 6 and ion permeable membrane 74. Concentrating chamber II is defined by ion permeable membrane 74 and ion permeable membrane 4. As with the case of membrane 6 and membrane 4, membrane 74 may be any membrane or barrier which will permit migration of anions there-through. Thus, ion permeable membrane 74 may be an anion permselective membrane or a suitable non-selective membrane. Numerals depicting elements of the apparatus of FIG. 3 are synonymous with numerals depicting the corresponding elements of the apparatus of FIG. 1. The process in the embodiment described in FIG. 3 is similar to the process for the embodiment described in FIG. 2 for the continuous, once through passing of the liquor where the flow streams are "staged". The effluent from first concentrating chamber 16 flows from outlet 40 into inlet 78 where it becomes the influent of second concentrating chamber 76. Effluent from second concentrating chamber 76 passes from outlet 80 into inlet 34 where it becomes the influent of anode chamber 14, and accordingly, where it is used as anolyte. The anolyte passes from anode chamber 14 at outlet 38 to suitable storage or to a pickling or other type of bath for reuse. The liquors entering first concentrating chamber 16 and second concentrating chamber 76 are designated first and second electrolytes respectively, and the liquor is preferably the "lean" pickle liquor effluent from spent liquor chamber 18 from which precipitates are removed in device 26.

Although ion formation and migration are not shown in FIG. 3, the formation and migration of ions are the same as those disclosed in FIGS. 1 and 2. Sulfate anions pass through membrane 74 from first concentrating chamber 16 into second concentrating chamber 76 where they form sulfuric acid when they associate with hydrogen ions in second concentrating chamber 76 and with hydrogen ion migrating from anode chamber 14 through membrane 4 into second concentrating chamber 76. Sulfate anions in second concentrating chamber 76 pass through membrane 4 into anode chamber 14 when membrane 4 is a membrane of the type which permits anions to pass therethrough. Accordingly, the sulfate anions reaching anode chamber 14 through membrane 4, form additional sulfuric acid when they associate with hydrogen ions formed at anode 10 migrating in the direction of cathode 12. Thus, in the circulation scheme described in the apparatus of FIG. 3 the liquor effluent from spent liquor chamber 18 which passes from outlet 52 to solids removal device 26 and exits therefrom depleted in acid and iron value and depleted in sulfate content, becomes enriched with sulfuric acid in first concentrating chamber 16, in second concentrating chamber 76 and finally in anode chamber 14 where it reaches its maximum sulfuric acid concentration.

In accordance with the present invention the construction of the electrodialytic apparatus permits the concentrating chambers to operate at acid concentrations lower than the anolyte chamber especially when the anolyte chamber is fed by the effluent from the preceding concentrating chamber. In this embodiment the concentrating chamber effluent is used to make up for the volume of the fortified or enriched acid directed as effluent from the anode chamber for use in the pickling process or for other uses. In accordance with FIGS. 2 and 3 the makeup electrolyte solution for the concentrating chambers is preferably effluent from spent liquor chamber 18 from which the bulk of the iron has been removed by passage through solids removal device 26 ("lean" pickle liquor). When a second concentrating chamber is interposed between the first concentrating chamber and the anode chamber and separated therefrom by ion permeable membranes, the concentration of acid in the electrolyte of the first concentrating chamber can be even lower than the system which utilizes a single concentrating chamber and assures even higher hydrogen ion recovery for final recovery in the more concentrated acid in the anode chamber.

Sulfate ion which migrates from the spent liquor chamber toward the anode combines or associates with the hydrogen ions migrating in the direction of the cathode to produce sulfuric acid. As the sulfate ion proceeds through the successive chambers containing electrolyte, in the direction of the anode and combines with hydrogen ion in the successive chambers to form sulfuric acid, the concentration of these acid electrolytes entering each successive chamber increases until the maximum concentration of sulfuric acid is reached in the anode chamber of those apparatuses having "staging" flow systems where the effluent of the preceding chamber is used as the influent in the suceeding chamber in the direction of the anode chamber. Thus, in such a system the concentrating chamber adjacent the spent liquor chamber has a sulfuric acid concentration lower than the suceeding concentrating chamber which in turn has a sulfuric acid concentration lower than that of the the anolyte in the anode chamber. Thus, there are increasingly concentrated acid solutions as the "staged" liquor approaches the anode chamber where the concentration of the acid is greatest.

Figure 4:
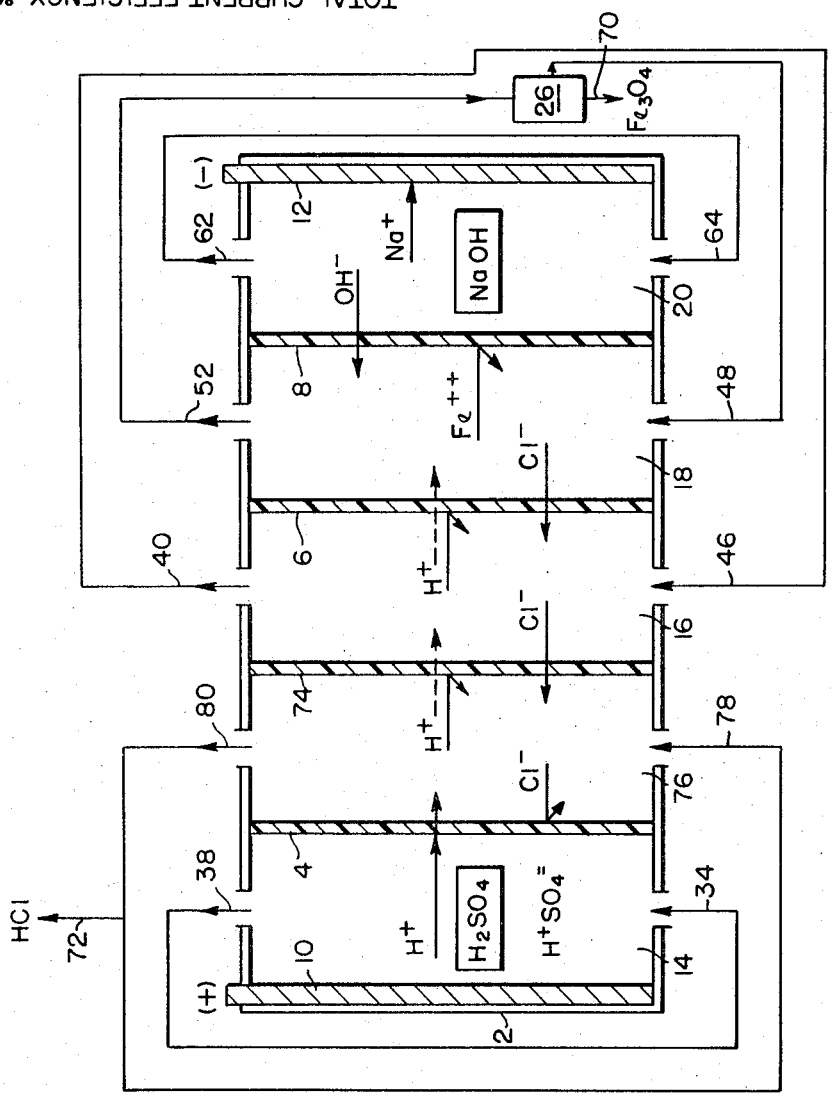
FIG. 4 is a diagrammatic cross-sectional representation of a five-chambered electrodialytic apparatus of the present invention designed for batch recycling of a hydrochloric acid-based liquor.

In the embodiment of this invention represented in FIG. 4 a closed loop system in a five-chambered cell is used for concentrating, regenerating and recovering hydrochloric acid from a pickle liquor stream. The numerals used in FIG. 4 correspond to those used in the previous figures. In FIG. 4, numerals 6, 8 and 74 represent anion permselective membranes and numeral 4 represents a cation permselective membrane. A hydrochloric acid pickle liquor stream used to clean iron and steel products and containing metal ions is circulated in chamber 18. The catholyte in chamber 20 is preferably an aqueous sodium hydroxide solution, and the anolyte in chamber 14 is preferably an aqueous sulfuric acid solution. Aqueous electrolyte is circulated in chambers 16 and 76. Inlets, outlets and conduits are designed to recirculate electrolytes, anolyte, catholyte and liquor in the respective chambers. A solids removal device 26, for the removal of precipitated solids from the pickle liquor stream is connected to the conduits which recirculate the pickle liquor. Vents, meters, pumps, reservoirs and the like are not shown. When the anolyte, electrolyte, catholyte and liquors are circulated in their respective chambers and a difference in potential is applied at the electrodes (cathode 12 and anode 10), hydrochloric acid is produced in chambers 76 and 16 and magnetite precipitate forms in chamber 18. Solids removal device 26 removes the precipitated magnetite from the pickle liquor stream as the pickle liquor circulates from outlet 52 through solids removal device 26. Pickle liquor depleted of magnetite then passes from 26 by means of a conduit and is returned to chamber 18 at inlet 48. As the spent pickle liquor becomes depleted of metal cations and acid anions, make-up pickle liquor can be added thereto; the pickle liquor depleted of metal and acid values can be discarded and replaced by additional spent pickle liquor by suitable conduits (not shown); or the depleted pickle liquor can be used for electrolyte in chamber 16 to concentrate the hydrochloric acid therein. Water may be added to anolyte and catholyte as needed to replace losses due to reactions at the electrode and evaporation in the respective streams by suitable means (not shown). Hydrochloric acid is also concentrated in chamber 76 and removed at line 72 for storage or for re-use in the pickling operation.

Although the embodiment shown in FIG. 4 represents a closed loop, five-chambered system where liquors, anolyte, catholyte and electrolytes are recirculated until the desired changes occur in liquor make-up and concentration, the concentration, regeneration and recovery of hydrochloric acid can also be carried out in the corresponding four-chambered systems and in systems characterized by "staging" of the electrolyte streams in accordance with the present invention. As an example of "staging" and for concentrating hydrochloric acid and referring to FIG. 3 the effluent of chamber 18 depleted of solids as it passes from solids removal device 26, said effluent from chamber 18 representing "lean" pickle liquor, can be circulated to inlet 46 where it becomes the influent of chamber 16. The effluent from chamber 16 which passes from chamber 16 at outlet 40 can be directed to inlet 78 where it becomes the influent of chamber 76. The effluent from chamber 76 representing concentrated and regenerated hydrochloric acid passes from said chamber at outlet 80 and is directed to storage or to the pickling operation (not shown in FIG. 3). This scheme represents a continuous, once-through, as opposed to recirculation, staging operation for concentrating hydrochloric acid. The anolyte stream in chamber 14, is recirculated from outlet 38 to inlet 34 (not shown in FIG. 3), and the catholyte stream in chamber 20, is recirculated from outlet 62 to inlet 64. When hydrochloric acid-depleted liquor is used as spent liquor in the apparatus of FIG. 3, ion permeable membrane 4 is preferably a cation permeable membrane.

The preferred embodiment for the concentration and regeneration of hydrochloric acid as represented by FIG. 4 is designed to prevent the migration of chloride ions into the anolyte chamber and thereby avoid the formation of chlorine gas at the anode. Accordingly, membrane 4 is preferably a membrane which will prevent the migration of chloride ion in the direction of the anode but which will permit hydrogen ion to migrate from chamber 14 into chamber 76. Membranes 6 and 74 may be any membrane which will permit chloride ion to migrate from chamber 18 into chamber 16 and from chamber 16 into chamber 76. Membrane 8 may be any membrane which will permit the migration of hydroxyl anion from chamber 20 to chamber 18 and at the same time prevent the migration of metallic cation from chamber 18 into chamber 20. Sequestrants are used in the catholyte solution to prevent membrane fouling.

When a difference in potential is applied and the catholyte comprises aqueous NaOH; the pickle liquor comprises aqueous $FeCl_2$ and free HCl; the anolyte comprises aqueous $H_2SO_4$; and the electrolyte of the concentrating chambers preferably comprise aqueous HCl, the following ion migration and association is believed to occur. Hydroxyl ion migrates from the cathode chamber to the spent liquor chamber where, after free HCl is removed, it associates with $Fe^{+2}$ to form magnetite, $Fe_3O_4$, which precipitates out of the liquor. Chloride ion migrates into the first concentrating chamber where it may associate with hydrogen ion to form HCl in the aqueous solution, and continues to migrate into the second concentrating chamber where it associates with $H^+$ ion to form more HCl in the aqueous electrolyte. $H^+$ ion migrates from the anode chamber into the second concentrating chamber where it associates with $Cl^-$ ion therein to form HCl in the aqueous solution. Since $H^+$ ion is a highly mobile ion, some $H^+$ ion "leaks" through membranes 74 and 6 when said membranes are anion permselective membranes, and may associate with $Cl^-$ ion in chambers 16 and 18 to form HCl in the aqueous liquors. However, due to the cell construction of the preferred embodiment, the major portion of the regenerated and recovered hydrochloric acid is accumulated in the second concentrating chamber and may be recovered at concentrations of about 5 to 15 percent (by weight) and higher of hydrochloric acid in water, therein.

Even though membrane 4 is a membrane which will prevent the migration of chloride ion in the direction of the anode, e.g., a cation permselective membrane in FIG. 4, in certain cases chloride ion may leak through membrane 4 and cause the formation of chlorine gas at the anode. When this occurs, it is within the scope of the present invention to use a membrane which will prevent the migration of chloride ion in the direction of the anode, e.g., a cation permselective membrane, as membrane 74. In this case concentrating chamber 76 serves as a chamber to contain and/or remove chloride ion which leaks through membrane 74. A plurality of such chambers defined by membranes which prevent the migration of chloride ion may be placed adjacent the anode chamber to prevent or substantially reduce the leakage of chloride ion into the anode chamber.

In another embodiment (not shown in the drawings) a membrane can be used to divide anode chamber 14 of the present invention into two chambers, a first anode chamber containing the anode and a second anode chamber adjacent the concentrating chamber, to limit the concentrating of any oxidants, e.g., chlorine, generated at the anode. When this embodiment is used, it is particularly preferred that a non-selective membrane divide the anode chamber into dual chambers in view of the fact that non-selective membranes are less susceptible to attack by oxidants than ion permselective membranes. Staging of the dual chambers at the anode so that anolyte liquor first enters the second anode chamber adjacent the concentrating chamber and passes therefrom to the first anode chamber containing the anode further protects the ion permselective membrane from attack by any oxidants formed at the anode. In this embodiment the anolyte is not generally recycled in order to avoid a buildup of the oxidants therein. If the anolyte is recycled, it may be externally treated to reduce oxidants levels. Since concentrations of oxidant in the anolyte are kept at a minimum near the ion selective membranes when this staged dual anode-chamber system is used, wetting of the surface of the ion permeable membranes separating the concentrating chambers and the anode chamber with the oxidant is minimal, and the life of the membranes is thereby extended.

The process of the present invention can be carried out in either batch or continuous operations as disclosed in the embodiments of FIGS. 1, 2, 3, and 4. In the case of a batch operation the process is continued until the resistance in the spent liquor chamber makes it economically unfeasible to continue. In the case of a continuous operation, the flow rates of the inlet and outlet streams of regenerated acid, "lean" spent pickle liquor, spent pickle liquor, and any other electrolytes may be balanced to maintain the acid concentration in the spent liquor chamber within the desired limits and conversely to achieve the desired acid concentration in the anode chamber, concentrating chamber or both.

Although the electrodialytic process and apparatus of the present invention is operable with more than two concentrating chambers, generally, there is little advantage in a cell design having 3 or more concentrating chambers therein unless additional chambers are necessary to prevent the migration of such ions as the chloride ion into the anode chamber. The highly mobile hydrogen ion migrating in the direction of the cathode is nearly all recovered in most systems comprising only two concentrating chambers. A cell design encompassing three or more concentrating chambers is, however, within the scope of the present invention and may be found useful in certain applications where substantial amounts of the highly mobile hydrogen ion is not associated with cation by the time it reaches the membrane separating the concentrating chambers from the spent liquor chambers.

Temperature is not a primary consideration in the operation of this process although there is generally a greater current efficiency, lower electrical resistance and more desirable electrochemical conditions when operating at higher temperatures. The cell will operate over the range of temperatures normally encountered in a pickling operation, that is, ambient up to about 200°F. and above in the event super-atmospheric pressures are desired. Electrical energy utilized in the apparatus to overcome the resistance thereof is converted into thermal energy and will cause the overall cell temperature to rise. This inherent characteristic of the apparatus may require suitable cooling devices to protect the apparatus, the membranes and the electrolytes.

Electrodes well known in the art may be employed in the apparatus and process of the present invention. Electrodes which are least susceptable to attack by the electrolytes of the chamber should be selected for the particular chamber. Materials for electrodes in acid-alkali electrodialytic cells are well known in the art. The electrodes may be of the type which completely define one wall of the anode and/or cathode chamber, and in such case the electrode chamber is defined by the electrode on one side and a membrane on the other side. When the electrode does not form an electrode chamber wall, the wall may be any suitable inert material and may be part of the frame, a separate inert barrier and the like.

In certain cases the ion permeable membranes in the electrodialytic apparatus of the present invention can be cation permselective membranes, for example, the ion permselective membrane between the anode chamber and the concentrating chamber can be a cation permselective membrane when it is desirable to prevent the migration of anion, such as chloride anion, from concentrating chamber to the anode chamber while at the same time permitting free or uninterrupted migration of the cation, such as the hydrogen ion, from the anode chamber into the concentrating chamber. When necessary to prevent anion migration into the anode chamber additional chambers defined by cation permselective membranes can be interposed adjacent the anode chamber. In the four-chambered embodiments the following membrane and chamber sequences may be used: (1) anode chamber, anion permselective membrane, concentrating chamber, anion permselective membrane, spent liquor chamber, anion permselective membrane and cathode chamber; (2) anode chamber, non-selective membrane, concentrating chamber, non-selective membrane, spent liquor chamber, anion permselective membrane and cathode chamber; (3) anode chamber, anion permselective membrane, concentrating chamber, non-selective membrane, spent liquor chamber, anion permselective membrane and cathode chamber; (4) anode chamber non-selective membrane, concentrating chamber, anion permslective membrane, spent liquor chamber, anion permselective membrane and cathode chamber; (5) anode chamber, cation permselective membrane, concentrating chamber, anion permselctive membrane, spent liquor chamber, anion permselective membrane, and cathode chamber and (6) anode chamber, cation permselective membrane, concentrating chamber, non-selective membrane, spent liquor chamber, anion permselective membrane and cathode chamber. In the five-chambered embodiments the ion permeable membranes separating the cathode chamber from the spent liquor chamber must be an anion permselective membrane; the ion permeable membrane separating the anode chamber from the adjacent concentrating chamber may be anion permselective, non-selective or in certain cases cation permselective; the ion permeable membrane separating the spent liquor chamber from the adjacent concentrating chamber may be anion permselective or non-selective; and the ion permeable membranes separating concentrating chambers in those embodiments having more than one concentrating chamber may be anion permselective cation permselective or non-selective.

To illustrate the use of cation permselective membranes to prevent the migration of anions, such as chloride ion, into the anode chamber when the spent liquor is for example, a spent hydrochloric acid liquor, examples of cell configuration for a six-chambered cell are (1) anode chamber, cation permselective membrane, concentrating chamber, cation permselective membrane, concentrating chamber, anion permselective membrane, concentrating chamber, anion permselective membrane, spent liquor chamber, anion permselective membrane and cathode chamber and (2) anode chamber, cation permselective membrane, concentrating chamber, cation permselective membrane, concentrating chamber, cation permselective membrane, concentrating chamber, anion permselective membrane, spent liquor chamber, anion permselective membrane, and cathode chamber. Other such configurations can be determined by one skilled in the art.

Although non-selective membranes may be used where indicated, it is preferred to use the anion permselective membrane, or in certain cases the cation permselective membrane, rather than the non-selective membranes. Non-selective membranes permit the passage of both anions and cations therethrough. If they are used to separate the anode chamber from the adjacent concentrating chamber, there is a less rapid build-up of acid concentration in the anode chamber than would be the case if an anion permselective membrane were used. Likewise, if non-selective membranes are used to separate concentrating chambers or to separate the spent liquor chamber from the adjacent concentrating chamber, there is less rapid build-up of acid concentration in the concentrating chamber or chambers than would be the case if anion permselective membranes were used.

Generally, the concentration of the electrolyte or acid electrolyte in the concentrating chamber may be any concentration which will sustain electrolytic conduction. Thus, the "lean" pickle liquor flowing from the spent liquor chamber is sufficient for an acid electrolyte solution if the concentration is sufficient to sustain electrolytic conduction between the electrodes. Acid electrolyte comprising any other suitable acid or mixtures thereof may also be used in concentrations which will sustain electrolytic conduction.

The current densities in the operation of this invention may be varied as desired. Recommended current density is between about 20 and about 800 amperes per square foot of effective area of membrane and preferably between about 100 and about 400 amperes per square foot for efficient operation. The operation of my invention is not limited by the current densities but rather by the availability of heat removing devices for cooling the system when high current densities are employed.

The term sequestering agent as used herein means a group or groups which will combine with a metal ion and render that ion "inactivated" in the solution so that it no longer exhibits normal reactions in the presence of precipitating agents. Sequestering agents, and those particularly useful in electrodialysis of the present invention, are well known in the art and are disclosed in U.S. Pat. No. 3,394,068. For the purpose of this invention either a complexing agent, or a chelating compound or other suitable agent may used. The sequestering agents useful in my invention must be water-soluble and must result in a water-soluble complex with the metal ion. Further, the sequestrant must be of a cationic type and should be resistant to cathodic reduction. The sequestering agent must be functional at pH values above 5 and preferably between about 11 and 14 in view of the fact that it is to be circulated in the alkaline chamber of the electrodialytic cell where the pH of the electrolyte is generally between about 11 and 14. The sequestering agent must also be functional at the operating temperature of the cell. The quantities of sequestering agents used in the catholyte are generally between 1 and 100 parts per 100 parts of 100 percent strongly basic, water-soluble hydroxide or its equivalent salt, having anions compatible with the anions of the acid to be regenerated, and preferably between 10 and 80 parts. Two or more sequestrants may be used in the catholyte, and when there are two or more types of ions in the system which will cause membrane fouling, then two or more sequestrants, each specific for a particular type of ion, may be used in the catholyte. Variation in the amount of sequestering agent used will be a function of its capacity for sequestering the metal ion in question, the concentration of that ion, interference from other ions, and the like.

Triethanolamine is the preferred sequestrant when the spent pickle liquor contains ferric and ferrous ion since it will sequester both types of ion. Examples of other sequestrants useful in the present invention are N-2-hyroxyethylene diamine, 2-(2-hydroxypropylamine) ethylamine, diethylene triamine, B, B', B''-triaminotriethyleneamine, triethylene tetramine, tetrapis-(2-aminoethyl)-ethylenediamine and diethylene triamine.

The following examples are set forth to illustrate more closely the principles and practice of the invention to those skilled in the art.

EXAMPLE 1

A four-chambered batch re-cycle electrodialytic cell (as shown in FIG. 1) was constructed by placing three anion permeable membranes between four pentagonal shaped polypropylene frames each about 1.3 cm thick and defining an area of approximately 38.7 cm². The membranes used were those sold by the Ionac Chemical Co. of Birmingham, N.J. and designated as Ionac MA 3475R. They were heterogeneous in nature and constructed on a webbing of inactive, supporting fabric. The three membranes placed between the polypropylene pentagonal shaped frames together with the electrodes that formed the end walls, defined the chambers. The anode was formed from chemical lead and the cathode was formed from mild steel. Electrical conduits from a suitable DC power source were attached to the electrodes. The circulating fluids were recycled from high density polyethylene carboys through polypropylene tubing and fittings.

The catholyte comprised a 5 percent (by weight) NaOH solution in water. To this solution was added triethanol amine, a sequestrant specific for iron cations. The anolyte comprises 7.9 liters containing 3.567 equivalents of $H_2SO_4$ per liter (in water). An aqueous solution of (8.0) liters of sulfuric acid (including contents of the plastic carboy reservoir) containing 0.637 equivalents of $H_2SO_4$/liter (in water) was circulated in the concentrating chamber.

An aqueous simulated pickle liquor comprising 1.18 equivalents of $H_2SO_4$/l and approximately 13.2 percent (by weight) of $FeSO_4$ in water in a total volume of 15 liters was circulated in the spent liquor chamber. By regular addition of concentrated $H_2SO_4$, the acidity of the "pickle liquor" was kept above 1.0 eq/l, so that the efficiency of the acid recovery could be studied without formation of the insoluble iron oxides.

All liquors and electrolytes were circulated in their respective chambers. Current was passed through the cells at a current density of 150 to 160 ma/cm². After 100 hrs. of continuous operation, no fouling of the anion membranes had occurred. The concentration of the acid in the anolyte or anode chamber had increased from 3.567 to 4.505 eq/l. ($H_2SO_4$). The acidity in the concentrating chamber was increased by 0.568 eq/l ($H_2SO_4$).

Figure 5:
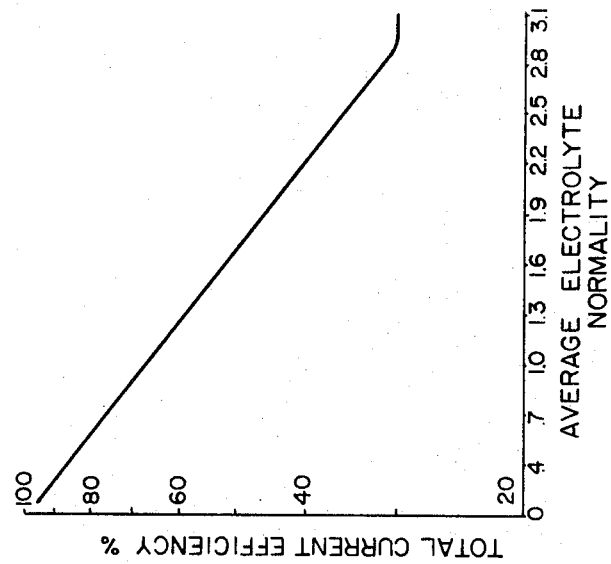
FIG. 5 is a graphical (semi-log) representation comprising total current efficiency (in percent) vs. concentration (in average normality) of electrolyte in the concentrating chamber of a four-chambered electrodialytic apparatus.

The effect of the concentration of the concentrating stream is shown in FIG. 5. The curve was constructed from suitable analyses of samples selected from the anolyte and concentrating streams as the run progressed. The change of the liquor concentration of the concentrating chamber was accelerated by sporadic addition of $H_2SO_4$ to the concentrating chamber stream (with titration after mixing to establish the "new" starting concentration for the subsequent operating period.) The combined anolyte plus the concentrating stream current efficiency from the acid formation process is shown in FIG. 5. Above a liquor concentration value of approximately 2.9 equivalents of $H_2SO_4$/l. of the concentrating chamber the total efficiency values become constant at 30 percent current efficiency.

EXAMPLE 2

A four-chambered electrodialytic cell was constructed as in Example 1 using anion permeable membranes. They were heterogeneous in nature and constructed on a webbing of inactive supporting fabric. The three membranes, placed between the polypropylene pentagonal shaped frames together with the electrodes that formed the end walls, defined the chambers. The anode was formed from chemical lead and the cathode was formed from mild steel. Electrical conduits from a suitable DC power source were attached to the electrodes. The circulating fluids were recycled from high density polyethylene carboys through polypropylene tubing and fittings.

The catholyte was similar to that of Example 1, and the anolyte comprised 6.0 liters containing 4.170 equivalents of $H_2SO_4$ per liter (in water). The electrolyte for the concentrating chamber comprised 8.0 liters (including contents of the plastic carboy reservoir) containing 0.520 equivalents of $H_2SO_4$/l (in water). The liquor in the spent liquor chamber simulating a pickle liquor, comprised 1.08 equivalents of $H_2SO_4$/l and approximately 13.2 percent (by weight) of $FeSO_4$ (in water) in a total volume of 16 liters. By regular addition of concentrated $H_2SO_4$, the acidity of the "pickle liquor" was kept above 0.85 eq/l, so that the efficiency of the acid recovery could be studied without formation of the insoluble iron oxides.

Current was passed through the cells at a current density of 150 to 160 ma/cm². After 75¼ hrs. of continuous operation, no fouling of the anion membranes had occurred. The concentration of the acid in the anolyte chamber had increased from 4.170 to 4.725 eq/l ($H_2SO_4$). The acidity in the concentrating chamber was likewise increased by 0.637 eq/l by the electrolytic process.

The effect of the concentration of the concentrating stream was essentially a duplication of the data depicted in FIG. 5.

EXAMPLE 3

A six-chambered electrodialytic cell was assembled in a manner similar to Example 1. The chambers were defined as follows: anode, anode chamber, cation permselective membrane, concentrating chamber III, cation permselective membrane, concentrating chamber II, anion permselective membrane, concentrating chamber I, anion permselective membrane, spent liquor chamber, anion permselective membrane, cathode chamber and cathode. The chambers were rectangular and each frame defined an area of approximately 11.5 in². The cation permselective membranes were heterogeneous crosslinked polystyrene sulfonic acid type membranes constructed on a webbing of inactive, supporting fabric (Ionac MC3470). The anion permselective membranes were heterogeneous crosslinked polystyrene-quaternary amine type constructed on a webbing of inactive supporting fabric (Ionac MA3475R). Suitable pumps conduits and reservoirs were provided for recirculation of the electrolytes through the respective chambers.

The anolyte comprised 8.0 liters of a 3.0 N-aqueous solution of $H_2SO_4$ containing 24.0 equivalents of sulfuric acid, which was continuously recirculated through the anode chamber. The electrolyte continuously recirculated in concentrating chamber III comprised 7.0 liters of a 1 N aqueous solution of HCl containing 1.02 eq/l. The electrolyte continuously recirculated in concentrating chamber II comprised 7.7 liters of aqueous HCl of 2.8 equivalents/liter, and electrolyte continuously recirculated in concentrating chamber I comprised 8.0 liters of aqueous HCl at a concentration of 0.77 equivalents/liter.

Aqueous simulated pickle liquor comprising 13.5 percent (by weight) $FeCl_2$ and 1.10 equivalents of HCl/liter was continuously recirculated in the spent liquor chamber. During the operating cycle regular additions of concentrated hydrochloric acid were made to the simulated pickle liquor. The acidity of the pickle liquor was kept above 0.85 equivalents/l to avoid formation and precipitation of oxides of iron which interfere with the efficiency studies of acid recovery. However, when acidity is not adjusted, the oxides of iron are precipitated in the spent liquor chamber and these can be removed by filtration. Catholyte composition and concentrations were the same as set forth in Example 1.

Direct current was passed through the stack at a current density of 300–400 amp/square foot (averaging 376 amps/ft²). For a period of 12 hours 24 minutes the electrolytes and liquors were continuously circulated through the chambers and periodic samples were taken and analyzed. At the end of the run the electrolyte in concentrating chamber I had absorbed 4.5 equivalents of HCl and increased in volume to 8.2 liters. The HCl in the electrolyte of concentrating chamber II increased by 3.3 equivalents and the volume of electrolyte therein increased 0.4 liters. The HCl in the electrolyte of concentrating chamber III increased by 0.35 eqivalents.

At an average HCl acidity of 1.0 N in concentrating chamber I, the current efficiency for the recovery and concentration of hydrochloric acid amounted to 58.2 percent. Appreciable recovery of HCl was achieved. Less than 0.01 equivalents of HCl (approximately 0.1 percent by weight) was lost to the anolyte stream.

Chrome, nickel and other cations can also be recovered from acid solutions in accordance with the present invention, especially, where insoluble oxides or hydroxides form when hydroxyl ions migrate from the cathode chamber to the spent liquor chamber. As an example of other process uses in addition to regeneration of sulfuric acid from spent pickle liquors, this invention has application in a system comprising dilute chromic acid in anode chamber 14, spent chromic acid (containing chrome, hydrogen, aluminum, iron and magnesium ion among others) is spent liquor chamber 18, and an alkaline solution with a cationic sequestrant specific for aluminum and a cationic sequestrant specific for magnesium in cathode chamber 20. The preferred acid electrolyte in concentrating chamber 16 would be "lean" liquor comprising the effluent from spent liquor chamber 18 which would be depleted substantially of aluminum, magnesium, and chrome ion. Upon passage of a direct electric current, the analog of the sulfuric acid system described above would take place; chromic acid would concentrate in concentrating chamber 16, and in the case of a system similar to FIG. 3, in second concentrating chamber 76, then in anode chamber 14. Chromous oxide, hydrous alumina and hydrous magnesium oxide would precipitate in spent liquor chamber 18 and by control of the pH, the metal oxides can be separated from each other, both oxides being removed by a suitable solids removal unit and the sequestrant in cathode chamber 20 would prevent fouling of anion permselective membrane 8 while continually regenerating itself.

Nickel may be concentrated, regenerated and recovered from a spent pickle liquor comprising nickel sulfate and optionally any excess sulfuric acid by the process and apparatus of the present invention. The nickel sulfate-containing spent pickle liquor would be circulated in the spent liquor chamber and precipitates of nickel would be recovered in the solids removal device. Sulfuric acid would be recovered in the concentrating chamber or the anode chamber.

It is within the scope of this invention to use any configuration and number of chambers that will result in the operation of an electrodialytic cell in accordance with the principles disclosed in this specification, that is, a stack of chambers comprising sequences of the units disclosed in FIGS. 1, 2, 3 and 4 of the present invention and described modifications thereof. This comprises stacks of four-, five-, six-, seven-chambered, etc., units as disclosed above operating within the same frame, and when feasible, said multi-chambered units sharing common electrodes and common circulating systems and common electrolyte solutions. One skilled in the art can add conduits, valves, vents, inlets, outlets, reservoirs, meters, gauges, gas sparging streams, and the like as deemed expedient for the particular operation and application of the apparatus. Although upward flow of liquor electrolyte, anolyte and catholyte is shown in the preferred embodiments, flow direction may be in any suitable direction for each chamber.

The terms, purification, regeneration, concentration and recovery, as used herein, are deemed interchangeable, and accordingly, the electrodialytic apparatus and process of the present invention may not only be used for regenerating liquors but also for purification, concentration and recovery of liquors or portions thereof by the removal of undesirable ions therefrom.

The terms, anion selective membrane, anion permselective membrane and anion permeable membrane are to be construed as equivalent for the purposes of this invention, and such membranes which act as hydraulic separators, are construed to be within the class of membranes defined as ion permeable membranes or membranes permitting the migration of anions. The term, non-selective membrane, defines a membrane that acts as a hydraulic separator, does not exhibit a significant preference for the passage of cations or anions and is also construed as belonging to the class of membranes designated as ion permeable membranes and membranes permitting the migration of anions. As used herein membranes which will permit the migration of anions are those membranes which are not only designed to permit anions to pass through but also those membranes which permit the leakage of cations therethrough, especially those cations having high mobility, such as, the hydrogen ion. Cation permselective, cation permeable and cation selective are equivalent terms herein and are used to designate membranes which act as hydraulic separators which are ion permeable and permit the migration of cations. Ion permeable membranes as used herein include cation permselective membranes, anion permselective membranes and non-selective membranes.

This invention achieves the stated objects by providing an economical method for regenerating, concentrating and recovering acid solutions which contain metal impurities or metal ions. Metal values are also recovered. The efficiency of electrodialytic methods for the regeneration and concentration of spent liquor has been substantially improved by preventing the migration of substantial amounts of hydrogen ion into the spent liquor stream during the operation of the apparatus by providing at least one guard or buffer chamber, designated herein as a concentrating chamber. The concentrating chamber prevents substantially all of the migrating hydrogen ion from entering the spent liquor stream by providing an electrolyte containing specified anions with which the hydrogen combines or associates and forms an acid which heretofor was lost in the spent liquor stream and is now diverted with the recovered acid. In view of this recovery of the migrating hydrogen ion in the concentrating chambers "staging" of the electrolyte streams can be advantageously applied in the electrodialytic recovery of acid from pickle liquors especially in a system wherein the spent pickle liquor is circulated in a spent liquor chamber. Recovered acid having a high concentration of acid can now be realized by utilizing "staging" of the liquor stream in a continuous, once-through electrodialytic process.

It is to be understood that the embodiments shown are preferred and are intended to be illustrative rather than limiting. Various modifications and changes may be made therein particularly in the form and relation of parts without departing from the spirit or scope of my invention as set forth in the appended claims.

I claim:

1. An electrodialytic apparatus for the regeneration and concentration of acid from a mixture of said acid and metal in solution comprising, a frame having in sequence therein an anode chamber adapted to contain circulating anolyte and having an anode with a surface in the anode chamber adapted to be in contact with the anolyte; at least one concentrating chamber adapted to contain circulating electrolyte; a spent liquor chamber adapted to contain a circulating mixture of said acid and metal in solution; a cathode chamber adapted to contain circulating catholyte having a cathode with a surface in the cathode chamber adapted to be in contact with the catholyte; ion permeable membranes separating said chambers, the membrane separating the cathode chamber from the spent liquor chamber being an anion permselective membrane having one side disposed in the cathode chamber and the other side disposed in the spent liquor chamber, the ion permeable membrane separating the anode chamber and the concentrating chamber having one side disposed in the anode chamber and the other side disposed in the concentrating chamber, and the ion permeable membrane separating the concentrating chamber and the spent liquor chamber being of the type permitting the migration of anions and having one side disposed in the concentrating chamber and the other side disposed in the spent liquor chamber; an inlet and outlet means for each chamber and means for circulating said anolyte, catholyte, electrolyte and mixture of said acid and metal in solution through the respective chambers; and means for imposing a difference in potential across the anode and cathode.

2. The apparatus according to claim 1 wherein the ion permeable membranes separating the anode chamber from the concentrating chamber and the concentrating chamber from the spent liquor chamber are non-selective membranes.

3. The apparatus according to claim 1 wherein the ion permeable membranes are anion permeable membranes.

4. The apparatus according to claim 1 wherein the ion permeable membranes separating the anode chamber from the concentrating chamber and the concentrating chamber from the spent liquor chamber are anion permeable membranes and non-selective membranes.

5. The apparatus according to claim 1 wherein the ion permeable membrane between the anode chamber and the concentrating chamber is a cation permeable membrane.

6. The apparatus according to claim 1 wherein the means for circulating the electrolyte through the concentrating chamber comprises suitable conduits for circulating the effluent of the spent liquor chamber in the concentrating chamber.

7. The apparatus according to claim 1 wherein the means for circulating the anolyte through the anode chamber comprises suitable conduits for circulating the effluent of at least one concentrating chamber to the anode chamber.

8. The apparatus according to claim 1 wherein the anode chamber comprises a first anode chamber having the anode surface therein and a second anode chamber adjacent said concentrating chamber, said first and second anode chambers separated by a non-selective membrane and communicating with each other by suitable conduit means to provide a sequential flow of anolyte contained therein from said second anolyte stream to said first anolyte stream.

9. The apparatus according to claim 1 wherein a plurality of concentrating chambers are interposed between said spent liquor chamber and said anode chamber and separated from each other and from said anode chamber by ion permeable membranes, said membrane separating the spent liquor chamber from the next adjacent concentrating chamber being an ion permeable membrane of the type permitting the migration of anions.

* * * * *